L. C. MARSHALL.
PISTON PACKING.
APPLICATION FILED OCT. 27, 1919.
1,400,560.
Patented Dec. 20, 1921.
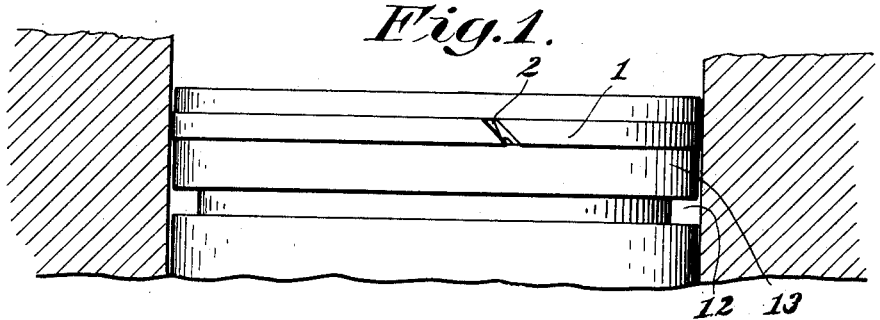
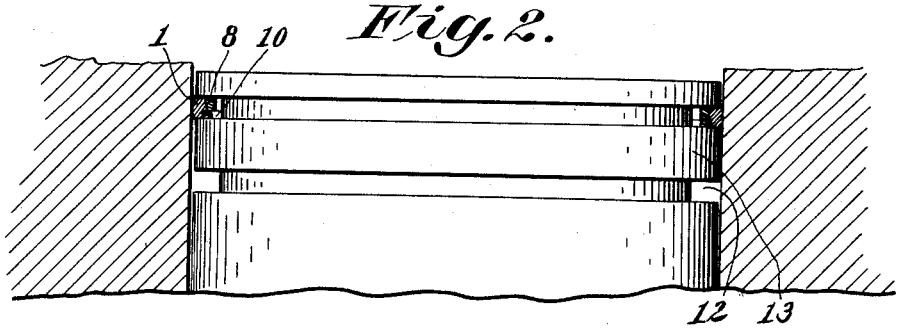
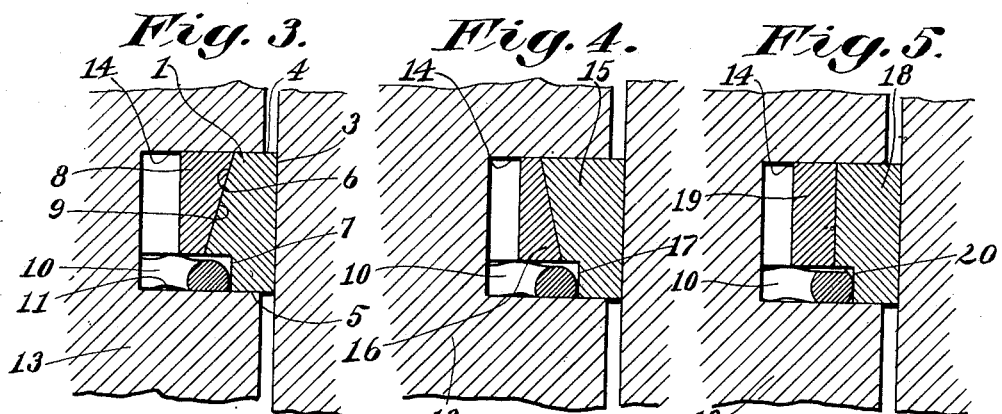
Inventor
Lewis C. Marshall
by Roberts Roberts & Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON-PACKING.

1,400,560.  Specification of Letters Patent.  Patented Dec. 20, 1921.

Application filed October 27, 1919. Serial No. 333,527.

*To all whom it may concern:*

Be it known that I, LEWIS C. MARSHALL, a citizen of the United States, and resident of Walpole, in the county of Norfolk and State of Massachusetts, have invented new and useful Improvements in Piston-Packing, of which the following is a specification.

This invention relates to piston packings and while adapted to the packing of pistons generally, it is especially designed for the packing of pistons of internal combustion engines. In such engines in operation the cylinder is cooled while the piston is hot and the latter therefore expands more than the cylinder and must fit loosely within the cylinder to avoid binding. In order to maintain the high compression which is necessary, the piston is provided with packing rings which not only must fit tightly against the cylinder wall, but must make a tight joint with the grooves of the piston within which they are positioned, to prevent leakage underneath the piston rings.

The principal object of the present invention is to provide a novel and improved metallic piston packing which shall accomplish these results and which shall also be simple in construction and free from multiplicity of parts and complexity of construction.

The invention will now be described in connection with certain specific embodiments of the genus of the invention.

In the accompanying drawings,—

Figure 1 is a partial side elevation of a piston head showing a packing positioned in a groove therein;

Fig. 2 is a partial side elevation of a piston head showing a packing in cross section positioned within a groove therein;

Fig. 3 is an enlarged detail view in cross-section, illustrating the form of packing shown in Figs. 1 and 2;

Figs. 4 to 7 inclusive are enlarged detail views in cross section, illustrating modified forms of packings;

Fig. 8 is a perspective view of a spring steel forcing or follower ring which may be employed with the packings illustrated in Figs. 1 to 7; and Fig. 9 is an enlarged detail view in cross section, illustrating a still further modification of the invention.

Referring to Figs. 1, 2 and 3 of the drawings, 1 represents a packing ring divided at a single point 2, but otherwise continuous, and preferably made of gray cast iron or other suitable material. This ring is substantially trapeziform in cross-section as shown in Fig. 3, having its peripheral face 3 disposed at right angles to its faces 4 and 5, and having an external diameter preferably about equal to the diameter of the cylinder bore. The inner face 6 of the ring 1 is beveled with respect to the peripheral face 3 at an angle, for example, of about 25°. The edge of the ring at the juncture of the beveled face 6 and the face 5 is cut away to form a reëntrant shoulder 7 for a purpose hereinafter described. A second ring 8 of cast iron or other suitable material is provided having a trapeziform cross-section, the outer face 9 of which is beveled at the same angle as the beveled face 6 of the ring 1 and is adapted to contact with the face 6. The ring 8 is divided at only one point to enable its insertion in the groove of the cylinder and is preferably a spring ring so formed as to exert a slight pressure against the inner face of ring 1. The position of the rings 1 and 8 when assembled is best shown in Figs. 2 and 3. The spring ring 10 is a forcing or follower ring preferably of spring steel, divided at a single point and as shown in Fig. 8 is crinkled or sinuous in a direction perpendicular to the plane of its generation, the sinuous form of the ring enabling it to expand both radially and in a direction perpendicular thereto. The ring 10 rests upon the radial wall 11 of the groove 12 in the piston head 13 and engages beneath the ring 8 and against the shoulder 7 of the ring 1 under compression thereby forcing the ring 8 against the radial wall 14 of the groove to insure a tight joint between the ring and the wall 14 of the groove 12 and forcing the ring 1 radially against the cylinder wall.

The three rings are assembled in the circumferential groove 12 of the piston head 13 in such positions that the lines of division of the rings break joint. Preferably the lines of division or clefts in the rings are positioned substantially 90° from each other so that the clefts are in broken joint relation to each other whereby the packing ring 1 is forced outwardly with more nearly even pressure throughout its periphery and the tendency of the ring to expand into an elliptical form thereby wearing the bore of the cylinder unevenly, is diminished. When assembled in the groove of the piston-head as shown in Figs. 1, 2 and 3, the ring 1 fits the cylinder bore and is urged into contact therewith by the spring ring 8 and also by the follower ring 10. The ring 10 urges the ring 8 upwardly against the wall 14 of the groove and the ring 8 due to its expansion and to its beveled contact with the inner face of the ring 1 urges the ring 1 both in a radial direction against the cylinder wall and in a downward direction against the radial wall 11 of the groove. The follower ring 10 because of its expansion radially against the shoulder 7 of the ring 1 urges the lower portion of the ring 1 radially against the cylinder wall and tends to offset any tendency of the ring 1 to twist due to the pressure of the ring 8 against its upper region. The contact between ring 8 and the wall 14 of the groove, the contact between ring 1 and the wall 11 of the groove and the contact between the ring 1 and the cylinder wall insure a gas tight joint between the piston head and the cylinder wall.

The modified form of packing shown in Fig. 4 is substantially similar to the packing shown in Figs. 1, 2 and 3, excepting that the slope of the beveled surface of engagement between the packing ring 15 and the follower ring 16 is reversed. The action of the spring ring 10 upon the ring 16 urges the ring 16 against the wall 14 of the groove, and ring 16 due to its expansion and to its beveled contact with the inner face of the ring 15 urges the ring 15 radially against the cylinder wall and toward the wall 14 of the groove. Both rings thus unite in effecting a seal with the wall 14 of the groove. The spring ring 10 might if desired be so positioned against the shoulder 17 of the ring 15 as to exert an upward pressure against the ring 15 to urge it toward the wall 14 of the groove, as well as to urge ring 16 toward the wall 14.

In Fig. 5 a further modified form of packing is illustrated. Both the packing ring 18 and the spring follower ring 19 are substantially rectangular in cross-section, the inner peripheral face of the ring 18 against which the ring 19 contacts being concentric with the outer peripheral face of the packing ring 18. The ring 18 is provided with a shoulder 20 as in the previously described embodiments, and the spring ring 10 is positioned beneath the ring 19 and against the shoulder 20 so as to urge both rings 18 and 19 against the wall 14 of the groove. The packing ring 18 is urged radially against the cylinder wall both by the spring follower ring 19 and by the spring ring 10.

In Fig. 6 a packing is shown substantially similar to that shown in Fig. 4 excepting that the packing ring 21 is not shouldered and the spring follower ring 22 does not extend into contact with the upper wall 14 of the groove. Ring 22 upon expanding urges the packing ring 21 against the cylinder wall and upwardly against the wall 14 of the groove. The tendency of the ring 22 to move downwardly toward the lower wall 11 of the groove by reason of its beveled contact with the ring 21 is offset by the upward pressure of the ring 10.

The modification disclosed in Fig. 7 is substantially similar to the modification shown in Fig. 4 differing therefrom only by the omission of the shoulder from the packing ring 23. The packing functions in the same manner as the packing of Fig. 4.

Instead of employing an annular steel follower ring 10 of the type disclosed in Fig. 8, a plurality of coiled springs 24 may be positioned as shown in Fig. 9 between the lower wall 11 of the groove and the lower face of the spring follower ring 25 for forcing the ring 25 upwardly against the radial wall 14 of the groove. These springs may be spaced at suitable intervals around the groove and held in position by extending into suitable holes in the ring 25 as shown at 26. This packing functions in the same general manner as the packing shown in Fig. 3, the beveled contact between the ring 25 and the packing ring 27 urging the packing ring 27 both radially against the cylinder wall and downwardly against the lower radial wall 11 of the groove.

In certain of the figures the follower ring 10 has been shown as formed from wire ground or drawn flat on one side, and in other figures as formed from wire ground or drawn flat on diametrically opposite sides. It is of course obvious that a wire follower ring of either form or of any other suitable cross-section might be used interchangeably with any one of the disclosed embodiments of the invention. The packings disclosed might also be reversed in the grooves of the piston head the follower ring 10 being positioned between the upper radial wall 14 of the groove and the spring and packing rings.

I claim:

1. In combination with an integrally formed piston having a peripheral groove provided with radial walls, a packing within said groove comprising a packing ring, a resilient ring engaging the inner peripheral surface of said packing ring, and yielding means disposed between said second ring and a radial wall of said groove, said means being constructed and arranged to urge said resilient ring into engagement with the opposite radial wall.

2. In combination with an integrally formed piston having a peripheral groove therein, a packing ring in said groove, a resilient ring engaging the inner peripheral surface of said packing ring, and spring means constructed and arranged simultaneously to urge said resilient ring in an axial direction and to expand said packing ring radially.

3. In combination with an integrally formed piston having a peripheral groove provided with radial walls, a packing in said groove comprising a packing ring, a spring ring engaging the inner peripheral surface of said packing ring, and spring means disposed between said spring ring and a radial wall of said groove.

4. In combination with a piston having an annular groove, a packing in said groove comprising a packing ring, a second ring engaging the inner peripheral surface of said packing ring, and a spring follower ring disposed between said second ring and a radial wall of said groove and having engagement with said packing ring.

5. In combination with a piston having an annular groove therein, a packing in said groove comprising a packing ring, a resilient ring engaging the inner peripheral surface of said packing ring, and a spring follower ring disposed between said second ring and a radial wall of said groove, such spring follower ring directly engaging a portion of the inner peripheral surface of the packing ring.

6. In combination with a piston having an annular groove, a packing in said groove comprising a packing ring, a spring ring engaging the inner peripheral surface of said packing ring, and a sinuous spring follower ring disposed between said spring ring and a radial wall of said groove and in contact with the inner peripheral surface of said packing ring.

7. In combination with a piston having an annular groove, a packing in said groove comprising a packing ring provided with a shoulder on its inner peripheral surface, a spring ring engaging the inner peripheral surface of said packing ring, and a sinuous spring follower ring disposed between said spring ring and a radial wall of said groove and in contact with the shouldered portion of said packing ring.

8. In combination with a piston having an annular groove, a packing in said groove comprising a packing ring having a beveled inner face, an annular shoulder formed in said beveled face, a second spring ring within said groove and having an outer beveled face corresponding to the beveled face of the packing ring, and a sinuous spring follower ring disposed between said second ring and a radial wall of said groove and in contact with the shouldered portion of said packing ring whereby said spring ring urges said second ring against a radial wall of the groove and urges said packing ring radially toward the wall of the cylinder.

9. In combination with a piston having an annular groove, a packing in said groove comprising a packing ring having a beveled inner face, an annular shoulder formed in said beveled face, a spring ring within said groove and having an outer beveled face corresponding to the beveled face of the packing ring, and a sinuous spring follower ring disposed between a radial wall of said groove and said spring ring and in contact with the shouldered portion of said packing ring whereby said follower ring urges said spring ring and said packing ring against a radial wall of the groove and urges said packing ring radially toward the wall of the cylinder.

Signed by me at Boston, Massachusetts, this 21st day of October, 1919.

LEWIS C. MARSHALL.